Figure 1:
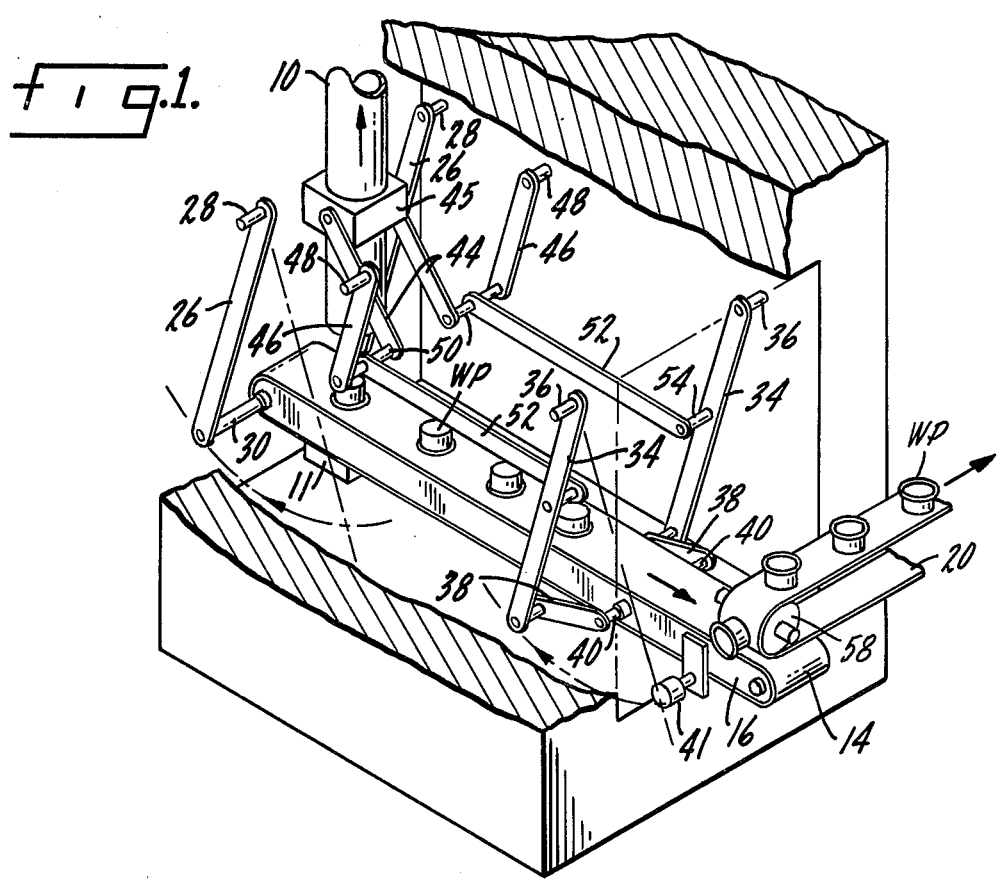

United States Patent [19]

Vandlik et al.

[11] 4,203,314
[45] May 20, 1980

[54] POSITIVE TRANSFER MEANS BETWEEN TWO INDEPENDENTLY DRIVEN MECHANICAL PRESSES

[75] Inventors: Robert P. Vandlik, Mt. Prospect; Frank J. Herdzina, Schaumburg, both of Ill.

[73] Assignee: American Can Company, Greenwich, Conn.

[21] Appl. No.: 907,487

[22] Filed: May 19, 1978

[51] Int. Cl.² .................... B21D 45/04; B30B 15/32
[52] U.S. Cl. ........................... 72/427; 72/345; 72/361; 72/426; 72/428; 72/422; 100/218; 198/631; 198/592
[58] Field of Search ............... 72/344, 345, 361, 405, 72/419, 421, 422, 426, 427; 198/690, 592, 631, 863, 865; 100/218; 74/99 R; 83/81, 129, 155, 155.1

[56] References Cited

U.S. PATENT DOCUMENTS

| | | | |
|---|---|---|---|
| 3,143,015 | 8/1964 | Luther et al. | 83/157 |
| 3,324,987 | 6/1967 | Kiesser | 198/631 X |
| 3,349,602 | 10/1967 | Nelson | 83/157 X |
| 3,840,064 | 10/1974 | von Woff | 198/631 X |
| 3,917,054 | 11/1975 | Hurst | 198/690 X |
| 3,918,280 | 11/1975 | Davis | 72/426 |

FOREIGN PATENT DOCUMENTS

| | | | |
|---|---|---|---|
| 2209849 | 9/1973 | Fed. Rep. of Germany | 72/426 |
| 2462130 | 4/1976 | Fed. Rep. of Germany | 72/426 |
| 448907 | 6/1975 | U.S.S.R. | 72/426 |

Primary Examiner—Francis S. Husar
Assistant Examiner—D. M. Gurley
Attorney, Agent, or Firm—Robert P. Auber; Ira S. Dorman; Stuart S. Bowie

[57] ABSTRACT

A cyclically operable machine having a work station where a blank is deformed into a work product and in which the work product is ejected on to a conveyor oscillated between that station and another conveyor to which the work product is delivered synchronously.

5 Claims, 2 Drawing Figures

U.S. Patent  May 20, 1980  4,203,314

POSITIVE TRANSFER MEANS BETWEEN TWO INDEPENDENTLY DRIVEN MECHANICAL PRESSES

This invention relates to a cyclically operable machine in which a blank is deformed into a work product, and in particular is concerned with transporting the work product out of the work station to another station.

In making shell-like container bodies one of the procedures is to deform a flat blank of steel or aluminum into a cup-shaped product which can be subsequently ironed into a much thinner shell. Deformation is accomplished by a cooperating ram and die and after the cup-shaped article is obtained it is customary to "knock out" the article into a bin at the side of the machine, one way or another in random fashion. Afterwards, the articles in the bin are jostled (vibrated), re-oriented and transferred by additional equipment to another machine for further processing. These steps involve repeated handling.

The primary object of the present invention is to dispense with the customary handling operations immediately following the deformation step and to enable the work product to be taken under control instantly, once it is ejected at the work station. This is accomplished by interposing an oscillating delivery conveyor between the work station and another conveyor to which the work product is delivered for transfer to another machine; the orientation of the ejected product, ejected to the delivery conveyor, is not disturbed and a constant product stream is maintained in synchronization between the work station and the transfer station where the work product is transferred to the other conveyor.

Figure 2:
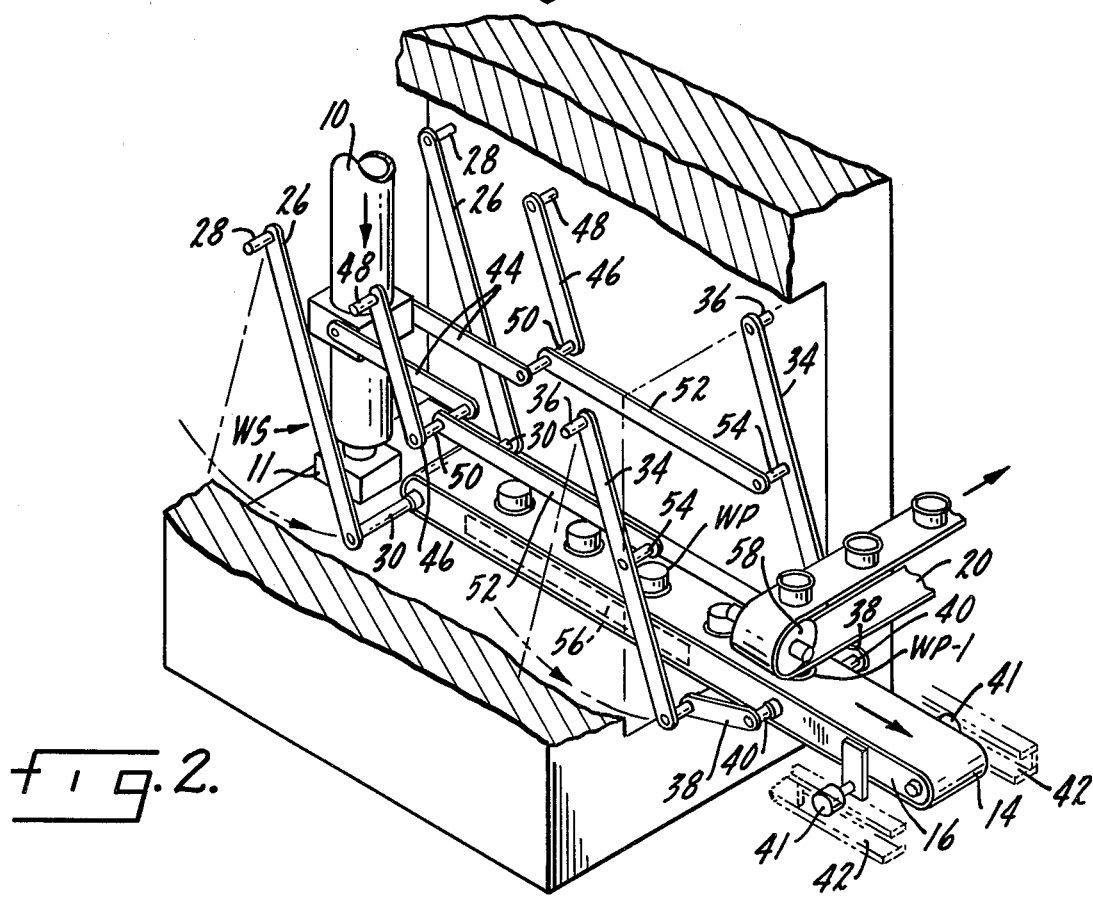

In the drawing:

FIGS. 1 and 2 are perspective views showing two phases of operational positions of a machine constructed in accordance with the present invention.

FIGS. 1 and 2 of the drawing show, in perspective, a fragment of a cyclically operable machine for producing a cup-shaped work product WP from a flat blank of metal fed to a work station WS, FIG. 2.

The work station comprises a vertically movable ram 10 and a fixed die block 11 together cooperating complementally in the closed position to shape the blank (not shown) into the cup-shaped work product.

Thus, the ram 10 is reciprocated between an elevated non-working position (FIG. 1) and a lowered working position where the metal blank is deformed, FIG. 2. Also, when the ram is elevated, after deforming the blank, the cup-shaped work product is inherently withdrawn by friction upwards with the ram and afterwards, in the elevated position, FIG. 1, a knock-out pin (not shown) mounted within the ram ejects the work product onto a delivery conveyor.

The delivery conveyor is represented by an endless conveyor belt 14 supported by a frame 16. As will be described in detail hereinafter, the frame is oscillated along a generally horizontal path so that one end of the conveyor belt is swung into and out of the work station to receive and deliver the ejected work product.

The end of the conveyor belt 14 opposite the work station is positioned beneath a receiving conveyor belt 20 so that the cups produced at the work station and delivered sequentially to the delivery belt may be transferred one by one to the receiving conveyor 20. Such transfer may be accomplished by suction means associated with the receiving conveyor or, as is preferred, by magnetic means hereinafter described.

The present invention is concerned principally with the manner in which the frame 16 is supported and oscillated; the manner in which this is accomplished will now be described in detail.

The frame 16 is supported for movement generally along a horizontal path by a plurality of suspension arms, four in number. Thus, a first pair of vertical suspension arms 26 are provided with pivot pins 28 supported in a fixed position in the machine. The lower ends of the suspension arms 26 are pivotally attached to long pins 30 which in turn are journaled to the end of the frame 16 adjacent the work station.

The suspension system for suspending and supporting the delivery belt frame includes a second pair of suspension arms 34 which at their upper ends are provided with pins 36 also journaled in the machine. Thus, the suspension arms 34, like the suspension arms 26, swing on fixed pivots. However, unlike the suspension arms 26 which are connected directly to the frame 16, the suspension arms 34 are preferably pinned pivotally at their lower ends to swing links 38 and these swing links in turn have their opposite ends pivotally connected to pins 40 which in turn are connected to the frame 16 adjacent the receiving conveyor 20.

While the suspension arms 34 may be pivotally connected directly to the frame 16 in the manner of the suspension arms 26, omitting the swing links, both ends of the conveyor belt would dip downward appreciably during movement from the position shown in FIG. 1 to the position shown in FIG. 2. To prevent this dip and to assure the delivery end of the conveyor belt 14 remains substantially in a horizontal plane, the frame 16 is provided with followers as 41 captured in fixed guide tracks 42 and thus it will be seen that the swing links 38 represent a lost motion connection so that curvilinear motion of arms 26 and 34 is translated into linear motion of frame 16 which is constrained for linear motion by the guide means 41–42.

As noted above, the frame 16 is oscillated as an incident to vertical motion of ram 10. In accomplishing this, a pair of drive links 44, at their upper ends, are pivotally harnessed to a shoe 45 secured to ram 10.

In order that the up and down motion of the drive links 44 will be translated into a horizontal force, a pair of rocker arms 46 are included in the drive link system. The upper ends of the rocker arms 46 are provided with pivot pins 48 having fixed axes. The lower ends of the rocker arms 46 are articulated to the lower ends of the drive links 44 by long pins 50. As a result, downward movement of ram 10 from the elevated, work product ejecting position of FIG. 1 toward the working position shown in FIG. 2, is accompanied by a horizontal thrust applied to the drive links 44 and this thrust is imparted to frame 16 by horizontal drive bars 52.

Thus, the end of each drive bar adjacent the work station is journaled to the pin 50 which joins the drive links and the rocker arms. The opposite end of each drive arm 52 is pivotally attached to a pin 54 in turn connected to the suspension arm 34 having the swing link 38 associated therewith. Consequently, the suspension arms 34 may be viewed as included in the drive link system along with the swing (lost motion) links 38.

A magnetized bar 56 is positioned inside frame 16 to hold the work products in place on belt 14. The receiving conveyor 20 turns on a pulley 58 which is magnetized to pick up a cup when presented therebeneath; a stronger magnet (not shown) beneath the top flight of belt 20 and adjacent pulley 58 assures the transferred cup escapes from the field of pulley 58.

The machine operates cyclically repeatedly to shape the individual work products from the blanks fed sequentially to the work station. The linear speed of the delivery belt 14 is synchronized to the linear speed of the receiving belt 20 so that spacing between the cup-shaped work products, and the delivery rate as well, corresponds to the production rate of the work station, which is to say that the leading-most work product as WP-1, FIG. 2, on belt 14 is delivered to the magnetized receiving belt pulley synchronously each time ram 10 is driven downward and repeatedly so in successive cycles of the machine.

As the ram 10 reciprocates, the delivery belt 14 is shuttled into and out of the work station to receive the ejected work product. While the end of frame 16 adjacent the work station rises and falls in the course of oscillation of frame 16, the swing links 38 are responsible for keeping the opposite end of the delivery belt at a substantially constant level or attitude relative to the receiving belt 20.

It will be seen that no manual effort is required to handle the work product from the time it is ejected until it is transferred to belt 20, nor is the orientation of the work product disturbed during this interval. Since movement of the frame 16 is necessarily synchronized to movement of ram 10, the back-and-forth cycle of the frame 16 is the same as the machine cycle and from this it follows that belt 20 can pick up the work products in the same sequence.

We claim:

1. In a cyclically operable machine where a starting blank of metal is worked into a work product at a work station by complementally configured punch and die members of which one member is reciprocal vertically between a lowered working position where the metal blank is deformed and an elevated position where the work product is ejected:

a driven, endless delivery conveyor belt supported by a frame for receiving and delivering the ejected product out of the work station; a plurality of suspension arms mounted on fixed pivots, said suspension arms comprising a first pair of arms pivotally connected directly to the end of the frame adjacent the work station, and a second pair of arms connected to the frame near its delivery end by lost motion swing links, said second pair of suspension arms supporting said frame for movement along a generally horizontal path so that one end of the endless delivery conveyor belt may be swung into and out of receiving positon beneath said one member to receive and deliver the ejected product, with the delivery end of the frame being slidably engaged in fixed, horizontal guide tracks;

a receiving conveyor belt adjacent the end of the delivery conveyor belt opposite the work station, and means for transferring the product from the delivery conveyor to the receiving conveyor; and a drive link system so connected between the suspension arms and said one member that vertical movement of said one member is translated into oscillation of the delivery conveyor frame into and out of said work station.

2. The cyclically operable machine of claim 1 wherein the drive link system comprises a first drive link pivotally connected at one end to said one member for vertical movement therewith together with a rocker arm having a fixed pivot to translate vertical movement of said first drive link into substantially horizontal movement of said rocker arm, said drive link system further including a horizontal drive bar pivotally supported at one end by said rocker arm and pivotally connected to one of said suspension arms.

3. The cyclically operable machine of claim 1 having magnetic means associated with the delivery conveyor belt to hold the position of the product thereon, and other magnetic means for transferring the product to the receiving conveyor.

4. The cyclically operable machine of claim 1 in which the delivery conveyor reciprocates along a path beneath the receiving conveyor, a pulley about which the receiving conveyor turns, said pulley being adjacent the end of the delivery conveyor remote from the work station, and said pulley being magnetized to pick up a product on the delivery conveyor.

5. In a cyclically operable machine where a starting blank of metal is worked into a work product at a work station by complementally configured punch and die members of which one member is reciprocal vertically between a lowered working position where the metal blank is deformed and an elevated position where the work product is ejected:

a driven, endless delivery conveyor belt supported by a frame for receiving and delivering the ejected product out of the work station;

a plurality of suspension arms mounted on fixed pivots, said suspension arms comprising a first pair of arms pivotally connected directly to the end of the frame adjacent the work station, and a second pair of arms connected to the frame near its delivery end by lost motion swing links, said second pair of suspension arms supporting said frame for movement along a generally horizontal path so that one end of the conveyor belt may be swung into and out of receiving position beneath said one member to receive and deliver the ejected product, with the delivery end of the frame being slidably engaged in fixed, horizontal guide tracks;

a receiving conveyor belt adjacent the end of the delivery conveyor belt opposite the work station, the receiving conveyor having a pulley adjacent the end of the delivery conveyor remote from the work station, said pulley being magnetized to pick up a product on the delivery conveyor; and a drive link system so connected between the suspension arms and said one member that vertical movement of said one member is translated into oscillation of the delivery conveyor frame into and out of said work station.

* * * * *